United States Patent [19]
Beck et al.

[11] Patent Number: 5,883,946
[45] Date of Patent: Mar. 16, 1999

[54] METHOD AND APPARATUS FOR PROVISIONING CUSTOMIZED TELECOMMUNICATIONS SERVICES

[75] Inventors: Douglas Beck, Colorado Springs, Colo.; Albert L. Chan, Somerville, N.J.; Sary Tauv, Somerset, N.J.; Lei Lei Wang, Princeton Junction, N.J.; Patrick K. White, Colts Neck, N.J.

[73] Assignee: Bell Communications Research, Inc., Morristown, N.J.

[21] Appl. No.: 757,308

[22] Filed: Nov. 27, 1996

[51] Int. Cl.⁶ ........................................................ H04M 3/42
[52] U.S. Cl. ............................ 379/201; 379/207; 379/229
[58] Field of Search ..................................... 379/127, 201, 379/207, 265, 230, 229, 142, 112, 114, 223; 395/500

[56] References Cited

U.S. PATENT DOCUMENTS

| | | | |
|---|---|---|---|
| 5,241,580 | 8/1993 | Babson, III | 379/201 |
| 5,241,588 | 8/1993 | Babson, III et al. | 379/201 |
| 5,315,646 | 5/1994 | Babson, III et al. | 379/201 |
| 5,323,452 | 6/1994 | Dickman et al. | 379/201 |
| 5,345,380 | 9/1994 | Babson, III et al. | 379/201 |
| 5,442,690 | 8/1995 | Nazif et al. | 379/127 |
| 5,450,480 | 9/1995 | Man et al. | 379/201 |
| 5,455,853 | 10/1995 | Cebulka et al. | 379/201 |
| 5,463,682 | 10/1995 | Fisher et al. | 379/201 |
| 5,481,601 | 1/1996 | Nazif et al. | 379/127 |
| 5,511,116 | 4/1996 | Shastry et al. | 379/201 |
| 5,519,772 | 5/1996 | Akman et al. | 379/265 |
| 5,533,115 | 7/1996 | Hollenbach et al. | 379/201 |
| 5,541,986 | 7/1996 | Hou | 379/201 |
| 5,590,181 | 12/1996 | Hogan et al. | 379/114 |
| 5,608,789 | 3/1997 | Fisher et al. | 379/201 |

*Primary Examiner*—Scott Wolinsky
*Attorney, Agent, or Firm*—Joseph Giordano; David A. Hey; Loria B. Yeadon

[57] ABSTRACT

A system for interfacing a service activation controller and a service management system allows a remote system to generate, update and delete call processing records and to create, update and delete tables. A provisioning message with one or more requests is sent to the service management system to process each request in the message, which identifies a unique logic template and one or more data templates and includes customized call variables data for inserting into a service record created from the template or updating an already created record. The resulting service record is activated by inputting the request to an integrated service point.

38 Claims, 7 Drawing Sheets

| CREATE CPR1 401 | UPDATE TABLE1 411 | UPDATE CPR4 421 |
|---|---|---|
| UPDATE CPR2 402 | DELETE CPR3 412 | |

```
CTC CODE-ESTABLISH, CHANGE, MOVE, ETC. ———— 431
PROVISIONING ID-THE LOGIC TEMPLATE NAME FOR THIS CPR —— 432
ACTION-(N FOR A NEW VIEW AND O FOR AN OLD VIEW) ——— 433
TN-THE NAME FOR THE SUBSCRIBER'S CPR —— 434
                                                          435
  A NS STRUCTURE
  SERVICE ID-THE NAME OF THE YES/NO CALL VARIABLE THAT IDENTIFIES IF THIS SERVICE IS ENABLED
  SERVICE ID VALUE-YES OR NO

TAG ID
      TAG VALUE

TAG ID
      TAG VALUE

TAG ID
      TAG VALUE
        .
        .
        .
                                      435
  A NS STRUCTURE
  SERVICE ID-THE NAME OF THE YES/NO CALL VARIABLE THAT IDENTIFIES IF THIS SERVICE IS ENABLED
  SERVICE ID VALUE-YES OR NO

TAG ID
      TAG VALUE

TAG ID
      TAG VALUE

TAG ID
      TAG VALUE
        .
        .
        .
```

METHOD AND APPARATUS FOR PROVISIONING CUSTOMIZED TELECOMMUNICATIONS SERVICES

CROSS REFERENCE TO RELATED APPLICATIONS

This application is related to U.S. patent application Ser. No. 08/168,612, entitled "A Network-Based Telephone System Having Interactive Capabilities," filed Jan. 31, 1994, now U.S. Pat. No. 5,519,772; U.S. patent application Ser. No. 07/934,240, entitled "System and Method for Creating, Transferring, and Monitoring Services in a Telecommunications System," filed Aug. 25, 1992, now abandoned; U.S. patent application Ser. No. 07/972,529, entitled "System and Method for Creating, Transferring, and Monitoring Services in a Telecommunications System," now abandoned; U.S. patent application Ser. No. 07/972,817 entitled, "A Method of Creating a Telecommunications Services Specification," filed Nov. 6, 1992, now U.S. Pat. No. 5,450,480; U.S. patent application Ser. No. 07/629,372, entitled "Visual Programming of Telephone Network Call Processing Logic," filed Dec. 18, 1990, now U.S. Pat. No. 5,323,452; and U.S. patent application Ser. No. 07/972,813, entitled "Method of Creating a Telecommunications Service Template," filed Nov. 6, 1992, now U.S. Pat. No. 5,455,853. This application is also related to copending U.S. patent application Ser. No. 08/757,309 by Wang et al., entitled "Method and Apparatus for Provisioning Call Processing Records Using Logic and Data Templates," filed concurrently herewith. The contents of these patent applications and patents are hereby incorporated by reference.

BACKGROUND OF THE INVENTION

The present invention relates generally to the field of customized telecommunication services, and more specifically to providing an efficient interface between a service management system that embodies telecommunications services and a service activation controller that receives and enters service orders into such a system.

The telecommunications industry is constantly providing new services to its customers. As the number and type of services increases, so too does the demand for systems for setting up and maintaining these services efficiently. One system, the Advance Intelligent Network (AIN) provides several services, but requires trained personnel to effect these services.

When a customer desires a new service or a change in service in one current system, the customer's local telecommunications site, such as the local telephone company, sets up a service order that is sent to a service activation controller (SAC) which transmits the service request to a service operator at a service management system. The service operator generates a call processing record (CPR) to implement the new or changed service by entering the service request to a service management system, such as Bellcore's Service Provisioning and Creation Environment (SPACE®) system.

A CPR defines how the telephone switching system processes a received telephone call for a particular customer. The CPR includes several nodes each containing instructions for performing a service. The incorporated patent applications discuss different methods of creating and changing data within the CPR.

To activate a CPR, the service operator must transfer the CPR to an integrated service control point (ISCP), which implements the corresponding services when the customer calls or is called. As explained in the incorporated patent applications, switches in the network route received calls to an ISCP. A multi-services application platform (MSAP) in the ISCP accesses a CPR, based on received calls, processes nodes in the CPR and issues corresponding call processing instructions back to the switch. The switches then route the calls based on these instructions.

A service operator may create the CPR from a template as discussed in U.S. Pat. No. 5,455,853. This patent shows sample templates that include logic and data values. Templates aid in the construction of CPRs. It is impractical and inefficient to require a service operator to build the same graph for every customer requesting the same service. Templates are a "form" for creating a customer specific version of a service. Customer specific versions of a service are established by providing values for "customizable" expressions or variables in a node, branch, or call variable within a template. In this manner, the template allows the same service to be provided to more than one customer without having to rebuild the entire graph or redefine generic call variables in the CPR establishing the service. Using this system, the service operator must individually insert data in templates to create CPRs and then sequentially and manually activate the CPRs. Activating a CPR involves sending the CPR to the MSAP and ISCP to allow access to the CPR during call processing.

Figure 1:
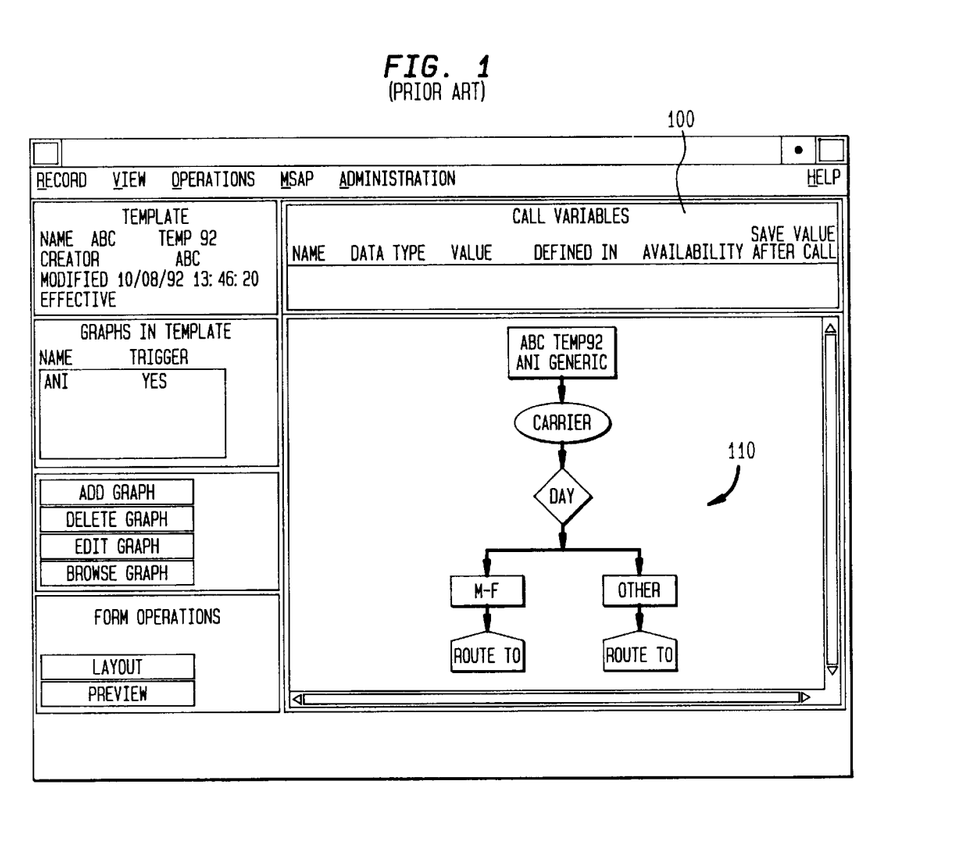
FIG. 1 is a sample template for organizing call logic and data.

FIG. 1 shows a template with a call variables window 100 and a logic graph 110. Logic graph 110 includes nodes that correspond to call processing instructions. Call variable window 100 includes the name of the call variables, the data type of each variable, such as integer, and, either a value or a location where the call variable is defined such, as in another template or at a global site.

To provide more efficient and faster services to customers, it is desirable to provide a system that interfaces the SAC to the service management system and allows for the automatic generation of a call processing request. Such an interface should also allow entry of customer information at a remote site, such as at a local telephone company, and transmission of the information to the central service management system for automatically generating and activating a CPR. Moreover, such a system should allow multiple requests to be sent in one message and activated together or at a later time, as specified by the SAC.

SUMMARY OF THE INVENTION

In accordance with the purposes of the invention as embodied and broadly described herein, the present invention provides a method for processing a provisioning message that includes call data associated with requested services and identification codes corresponding to one or more templates defined in the service management system. The method includes the steps of decoding the provisioning message, selecting one or more of the defined plurality of templates that are targeted in the provisioning message, and generating a service record by inserting the call data in for call variables defined in the selected templates in accordance with the requested service when the format for data specified in the provisioning message matches the predetermined request format defined for data in the templates.

In another aspect, the present invention provides a system for processing a provisioning message that includes call data associated with a requested service and identification codes corresponding to one or more templates, the templates having a corresponding predetermined data format. The system includes structure for decoding the provisioning message, structure for selecting from the defined templates that are requested in the provisioning message, and structure for generating a service record by inserting the call data in for call variables defined in the selected template(s) in accordance with the requested service.

BRIEF DESCRIPTION OF THE DRAWINGS

The accompanying drawings, which are incorporated in and constitute a part of the specification, illustrate preferred implementations of this invention and, together with the general description above and the detailed description of the preferred implementations given below, serve to explain the principles of the invention.

In the drawings.

BEST MODE FOR CARRYING OUT THE INVENTION

Reference will now be made in detail to the construction and operation of preferred implementations of the present invention which are illustrated in the accompanying drawings.

Figure 2:
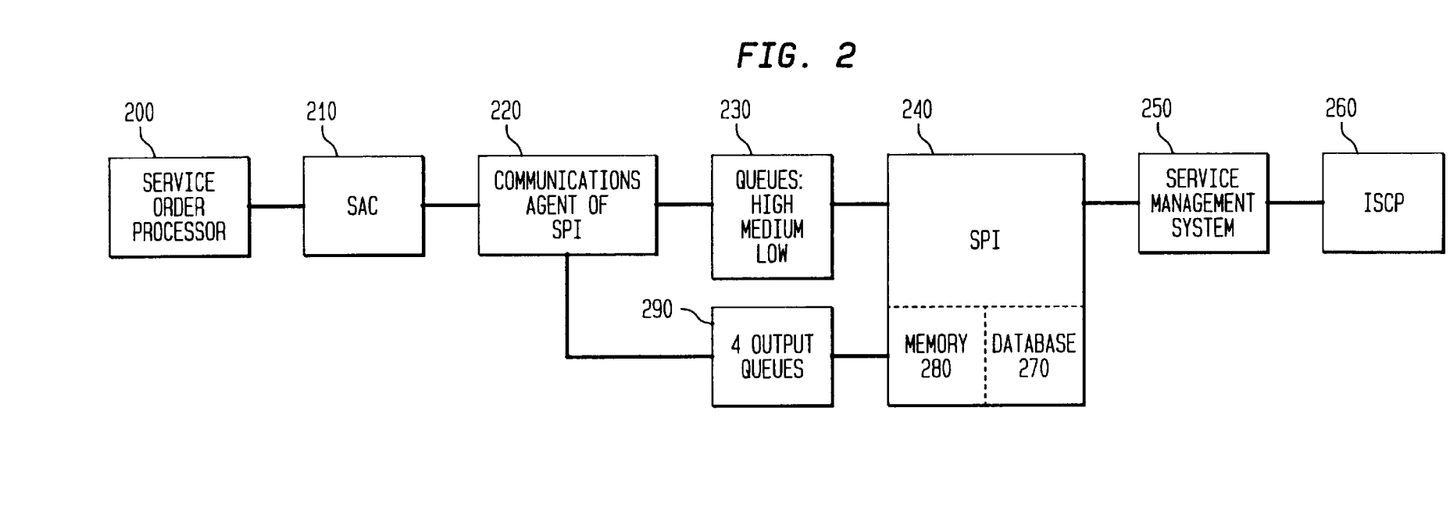
FIG. 2 is a block diagram of the system for processing a provisioning message in accordance with the present invention.

FIG. 2 shows a block diagram of a service processing system in accordance with the present invention. A remote user in a local telephone company enters a service order to a service order processor 200 which in turn enters the service order to an SAC 210 among several SACs.

SAC 210 sends a provisioning message to a communications agent 220 of Service Provisioning Interface (SPI) 240, communications agent 220 of SPI 240 determines a priority level of the provisioning message by reading the priority level designated in the request and places the provisioning message, in one of the queues 230.

A preferred embodiment of the present invention includes three queues 230: a high priority queue, a medium priority queue, and a low priority queue. The communications agent 220 selects a queue 230 based on the determined priority level indicated in the provisioning message. SPI 240 retrieves provisioning messages from the queues 230, and after processing, sends response messages to one of four output queues 290 connected to the communications agent 220 which in turn sends the responses to SAC 210. The four queues each correspond to a different SAC 210.

SPI 240 includes a memory 280 that stores procedures for performing various functions outlined below in the flowcharts shown in FIGS. 5–7. In performing these procedures, SPI 240 accesses a database 270. Database 270 stores CPRS, tables, templates, and a log.

Service management system 250 communicates with an ISCP 260 to activate service requests in a provisioning message by placing a provisioning message in a queue 290 for input to the ISCP 260. As discussed above, ISCP 260 carries out call processing and allows the service requested to be used and accessed by telephone systems. When ISCP 260 receives a service request, it sends an acknowledgment signal back to SPI 240. SPI 240 in turn sends an acknowledged signal to SACS 100. The preferred embodiment includes the SPACE system as the service management system 250.

OPERATING SYSTEM (OS) NETWORK

Figure 3:
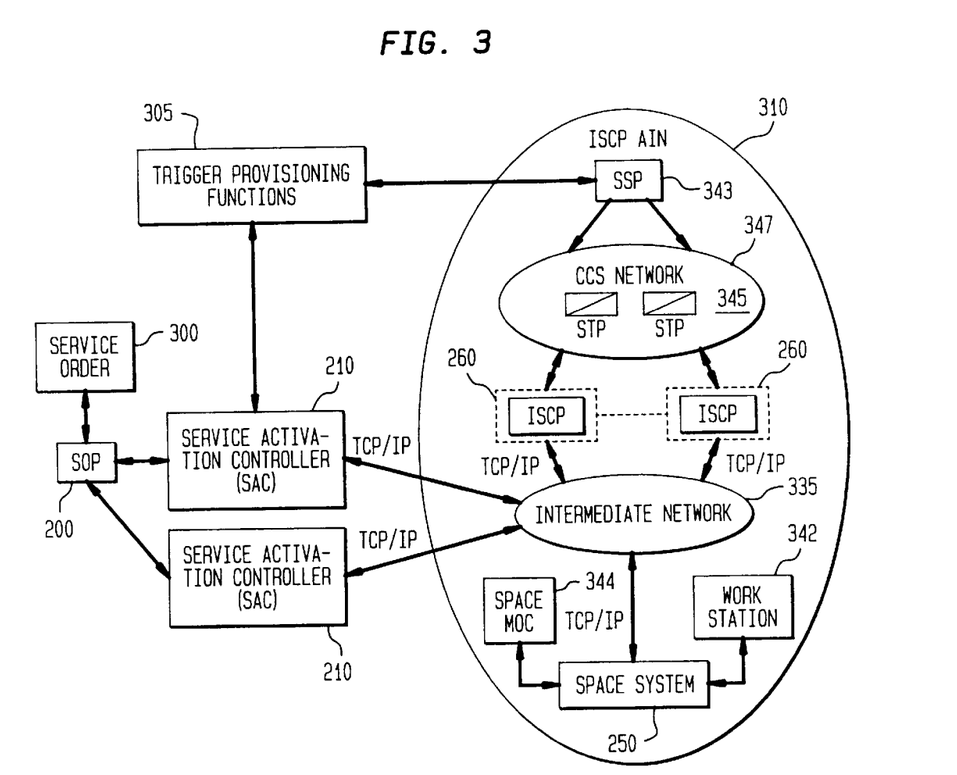
FIG. 3 shows the operating system architecture for an advanced intelligent network provisioning and activation system.

FIG. 3 shows the architecture for the AIN 310 configured according to a preferred implementation of this invention. FIG. 3 also contains other elements that interface with AIN 310.

A user enters service order 300 to a service order processor 200 positioned at a local telephone company to accept service orders, which in turn passes the order to one of the SACs 210. One of the SACs 210 processes the order and sends a provisioning message to an intermediate network 335 in system 310. The intermediate network 335 includes communications agent 220, queue 230, memory 280, and SPI 240 shown in FIG. 2, which, together with service management system/SPACE 250, generates or updates CPRs based on the provisioning message in the provisioning message. Service management system/SPACE 250 has associated work stations 342 to allow an operator access to the service management/SPACE system 250 directly, and a maintenance operating console 344 to monitor the status of the ISCPs 260.

The created service orders are activated by sending the CPRs to ISCPs 260. ISCPs 260 communicate with the channel signaling (CCS) network 347 which contains signal transfer points (STPs) 345. The CCS network 347 uses the STPs 345 to provide packet switching functions for transporting data. Service switching point (SSP) 343 receives input from a caller and responds to triggers identified in the trigger provisioning functions 305.

When one of the SACs 210 receive a message from intermediate network 335 indicating that a CPR was activated, that SAC informs a trigger provisioning system 305 to provision triggers to alert SSP 343 of the existence of a CPR associated with a customer site.

COMMUNICATION PROTOCOL

Communication between SAC 210 and communications agent 220 preferably uses a transmission control protocol/internet protocol (TCP/IP). TCP/IP is an internet standard for packet switching between computing systems. The TCP protocol is reliable and provides full duplex end-system to end-system data communications. The IP protocol provides a connectionless-mode network service and is responsible for providing internet-working over the widest possible range of diverse subnetwork technologies including routers and bridges.

SERVICE ACTIVATION CONTROLLER (SAC)

SAC 210 is a part of an external system, usually the local telephone company's system, for initially accepting service orders. Before the service management system 250 communicates with SAC 210 through SPI 240, templates, such as shown in FIG. 1, must be created and stored in database 270. At least one logic template must be stored in the database 270 so that a CPR may be created.

SAC 210 receives a service order and generates a service activation requests preferably in ASN.1 notation. ASN.1 notation is an international standardized language to define OSI application protocols. In the preferred embodiment, SAC 210 performs all preliminary processing on the service requests so that one or more service activation requests are sent to SPI 240 in the format of a provisioning message. A provisioning message includes an order number, a transmitting system identifier, a receiving system identifier, a user identifier, a due date for service, a provisioning message identifier, requested service identifiers and associated data values such as assigning a yes value to indicate the activation of a service or a telephone number indicating a forwarding number. Requested services may require creating, changing, deleting, suspending, restoring, moving CPRs, and creating, updating and deleting tables.

PROVISIONING MESSAGE

Figure 4A:
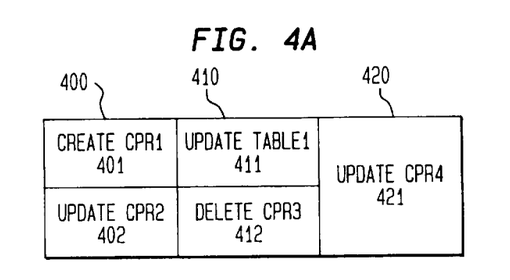
FIG. 4a shows an example of the basic format of a provisioning message which includes one or more message blocks, each message block including one or more provisioning requests in accordance with the present invention.
Figure 4B:
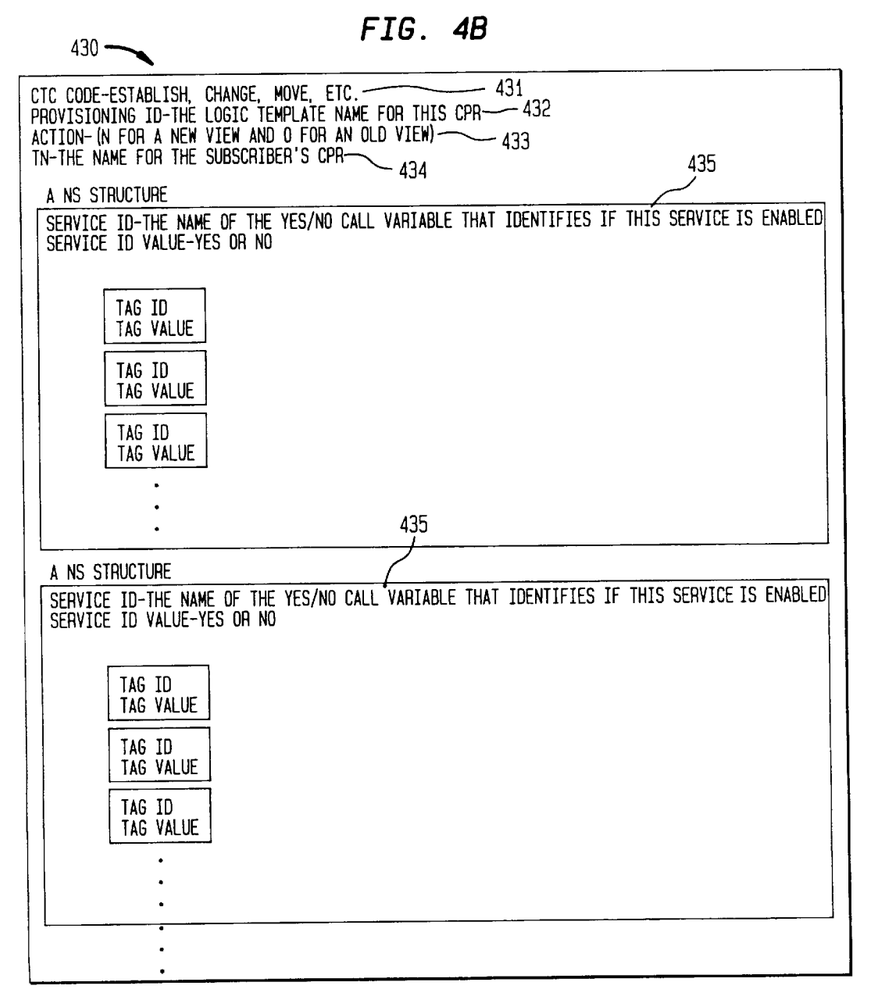
FIG. 4b shows an example of an overall structure of a provisioning message in accordance with the present invention.

SPI 240 receives a provisioning request message in a format such as shown in FIGS. 4a and 4b. FIG. 4a shows an overall configuration of a provisioning message that includes several requests divided into blocks 400, 410 and 420. The message blocks 400, 410, and 420 are unrelated to each other meaning that the requests in block 400 are carried out independently of requests in blocks in 410 and 420. Therefore, requests 401 and 402 in message block 400 may be carried out even when requests 411 and 412 in message block 410 fail processing.

Requests within a single block are related such as subrequests 401 and 402 in block 400 and subrequests 411 and 412 in block 410. For example, in message block 400, subrequests 401 and 402 are related to each other, thus if the first subrequest 401, creation of CPR1, is unsuccessful, then the second subrequest 402 will not be carried out and CPR2 will not be updated. If, on the other hand, subrequest 401 is successful, but subrequest 402 is unsuccessful then the service request record for creating CPR1 will be undone or rolled back. Message block 420 merely has one request 421 and requires updating CPR4 and is not related to any other request.

FIG. 4b shows a basic structure of an activation request in the provisioning message 430. In message 430, a code 431 identifies the request type, such as establish, move, delete, suspend, restore, and change, a provisioning identifier 432 identifies a logic template name, message 430 also identifies an action 433, such as new versus old view, and a name 434 of the subscriber's CPR.

Provisioning identifier 432 uniquely identifies a corresponding template stored in database 270. Each request 435 includes data values for call variables defined in the corresponding template, and each call variable has a corresponding data type and format.

The request 435 may include an identifier for a combined logic and data template or for separate logic and data templates as described in the co-pending patent application entitled "Method and Apparatus for Provisioning Call Processing Records Using Logic and Data Templates."

PROCESSING A PROVISIONING MESSAGE

Figure 5:
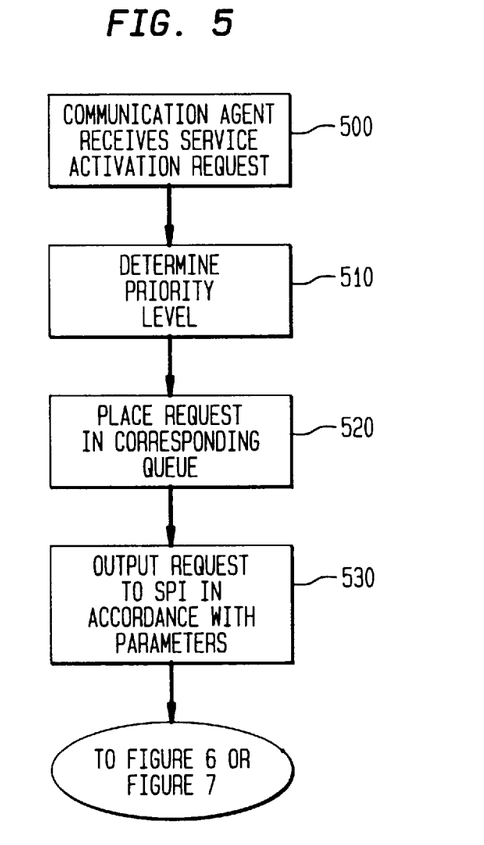
FIG. 5 shows a flowchart of the processing steps carried out by the communications agent of the service provisioning interface (SPI) in accordance with the present invention.
Figure 6:
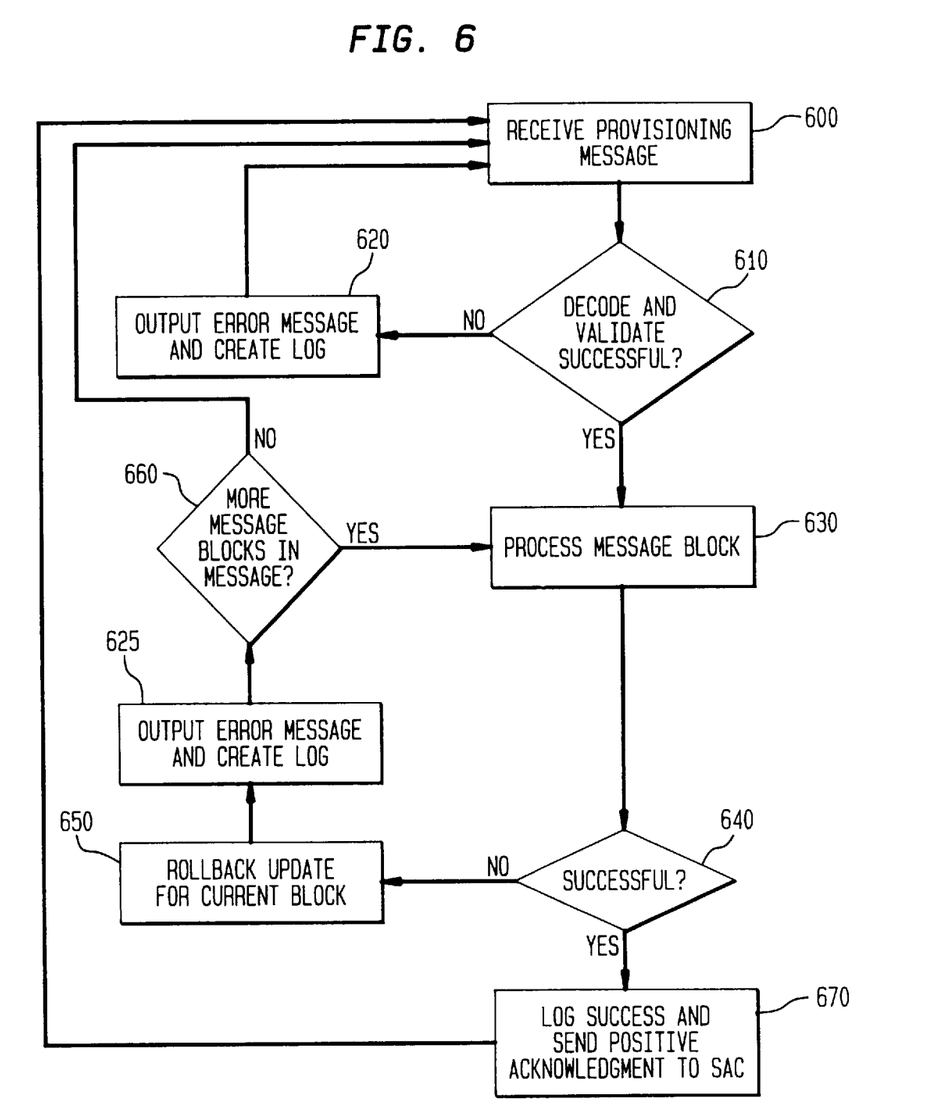
FIG. 6 shows a flowchart of the steps for processing a provisioning message in accordance with the present invention.
Figure 7:
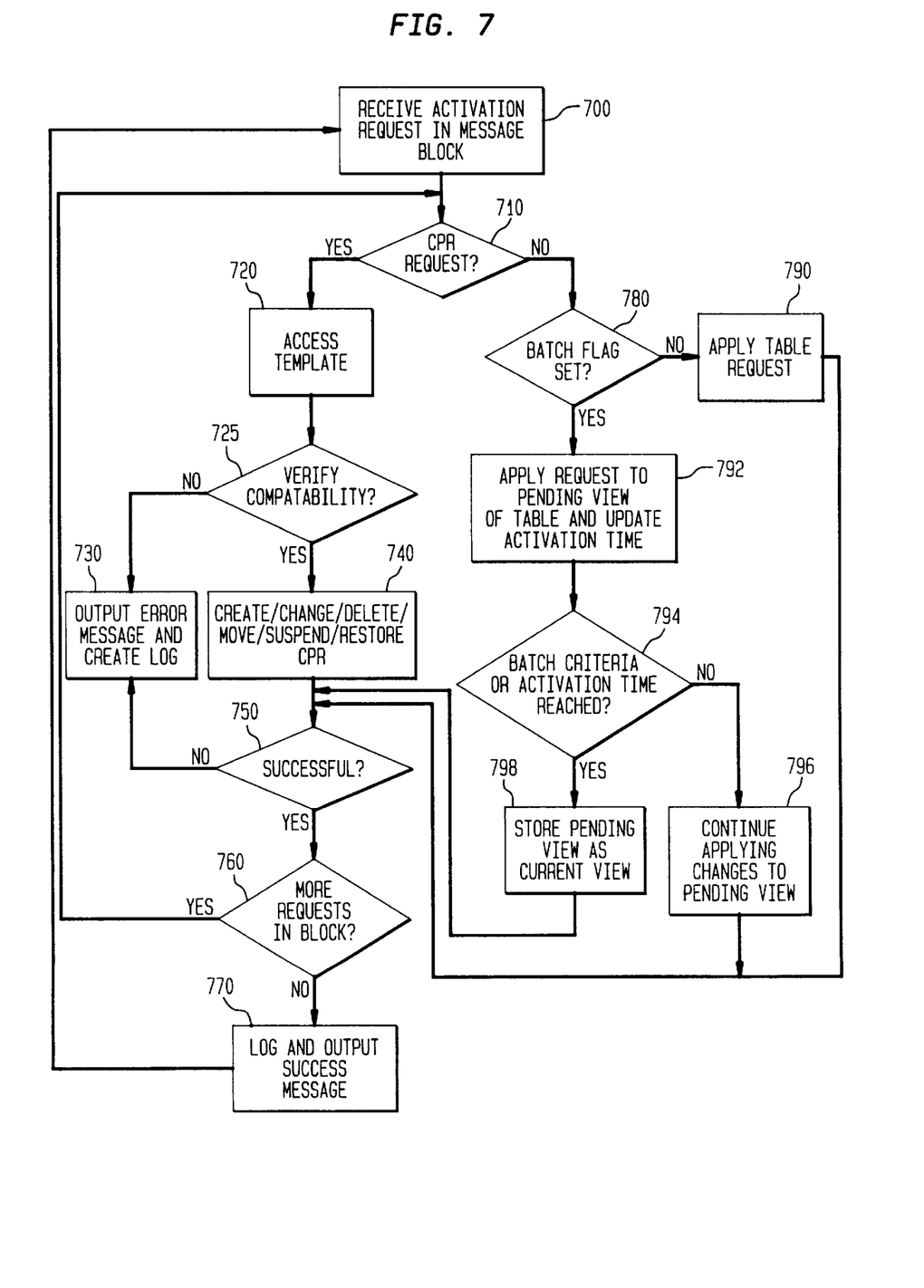
FIG. 7 shows a flowchart of the processing steps required for CPR/table updates a message block in accordance with the present invention.

FIGS. 5–7 contain flowcharts outlining the steps of the procedures stored in memory 280 for executing a provisioning message with one or more provisioning messages. As shown in FIG. 5, communications agent 220 receives a provisioning message request (step 500). The communications agent 220 determines a priority level of the provisioning request by reading the priority value in the header of the provisioning message (step 510). The provisioning message is then placed in one of the three queues based on the priority level (step 520).

SPI 130 receives the provisioning message from the queues (step 530). Before reading from the queues, it will read a parameter set by a system operator that determines which queue to read from. The parameter may require that all requests in the high priority queue be processed before any requests in the medium or low priority queue or that the low priority message requests be processed during a predetermined time interval, which preferably corresponds to a non-busy time period value.

In a preferred embodiment, a tunable priority processing unit (PPU) is assigned to each queue and specifies the number of requests that will be processed by each queue. For example, ten requests from the high priority queue may be processed first, then five requests from the medium priority queue, and then one request from the low priority queue.

In the preferred implementation, the received provisioning message is in the abstract syntax notation (ASN.1) and is encoded using the basic encoding rules (BER). As shown in FIG. 6, after receiving the provisioning request from the queue (step 600), the provisioning message is decoded (step 610) and returned as a C++ object containing the data structure of the message. If the decoding step is unsuccessful, an error message is placed in a log in database 270 and then sent to the SAC (step 620).

After a successful decode, SPI 240 compares a user identifier in the provisioning message to a list of permissible actions for that user identifier to validate the message (step 610). If the user is not valid, an error message is logged and sent to the SAC 210 (step 620).

When the format of the provisioning message is proper, the message blocks in the message are processed one at a time (step 630). FIG. 7 shows a flow chart of a procedure for processing a request.

SPI 240 determines whether the processing of the request was successful (step 640). If so, a positive acknowledgment indicating success is logged and sent to the SAC 210 (step 670) before continuing processing the next received provisioning message. Otherwise, the current request is rolled back or undone (step 650) and an error message is logged and output to the SAC 210 (step 625). SPI 240 determines whether there are additional message blocks in the provisioning message (step 660). If so, processing continues with the next message block (step 630). Otherwise, processing continues with the next received provisioning message (step 600).

SPI 240 processes activation requests in a received message block (step 700) by first determining whether the request relates to a CPR or a table (step 710). If the request involves a CPR, SPI 240 accesses the template corresponding to the request (step 720). SPI 130 then compares a format of the provisioning request to a format associated with the template identified in the request to verify that the proper number and type of call variables are present (step 725). As discussed above, each provisioning message may either include an identifier for a combined logic/data template or may include a provisioning identification code that identifies a logic template and service identifiers which identify one or more data templates stored in database 270. The template has call variables that require a specific data type. Therefore, the provisioning request must provide data of the proper type to insert for the call variables. If sufficient data, or data of the wrong data type is provided, then an error message is logged and output to the SAC 210 (step 730).

The step of verifying the compatibility further includes verifying the existence or nonexistence of the CPR in question. For example, when the CPR does not exist and the request is for deleting or updating of a CPR an error message is logged and output to the SAC 210 (step 730). If the request is for adding a new CPR, then an error message is logged and sent to the SAC when the CPR exists.

A service request record corresponding to the action specified in the request is generated (step 740). These actions may include creating, deleting, changing, or suspending a CPR. Creating a CPR means inserting the received call data in for call variables in the template resulting in a call processing record. Deleting a CPR requires that a CPR identifier be included in the request so that the CPR may be deleted. Suspending a CPR means that the identified CPR is made unavailable for a caller to use until further notice. SPI 240 determines whether the service request record was successfully generated (step 750). If not an error message is logged and output to SAC 210 (step 730).

Otherwise, SPI 240 activates the CPR and checks whether more requests are in the block for processing (step 760). If so, processing continues with the additional requests in the block. If not, a successful processing message is logged and sent to the SAC 210 (step 770). The additional requests are processed when there are additional requests in the block (step 710).

For table requests (step 710), SPI 240 checks whether a batch flag is set in the provisioning message(step 780). A batch flag indicates that a copy of the table subject to the request should be stored in memory 160. This copy of the table is then updated as indicated in the requests. Therefore, if the batch flag is set, the table update is batched with other pending updates and applied to the pending view of the table, and the activation time for the table is set based on information in the request (step 792). When the activation time arrives (step 794), or when a maximum number of batch updates are received forcing the activation time to be set to immediate (step 794), the pending view of the table is stored as the current view of the table (step 798). In the meantime, SPI 130 groups updates to a table until the activation time is immediate (step 796).

In order to replace the current view of the table with the pending view, the service managing system 250 places the pending table, with an immediate activation time, in a queue directed to ISCP 260 to activate the table. In a preferred embodiment, ISCP 260 acknowledges the activation of the table by sending a response to the service managing system 250, which in turn updates the log and the status of the request as complete, and sends a second acknowledgment signal to SAC 210.

For table requests with the batch flag not set (step 780) the activation time is immediate, and a table record corresponding to the activation specified in the request is generated and applied to the table (step 790). These actions may include creating, changing or deleting a table or a row or column in the table.

If the table request is applied successfully (step 750) and more provisioning messages are determined to be in the message block (step 760), they are individually processed beginning with step 700. If the update is not applied successfully (step 750) then an error message is logged in the database 270 and output to SAC 210 (step 730).

In a preferred implementation for a batched set of table changes, SPI 240 creates a log in the database 270 indicating the status of the request as pending and logs and sends a message indicating success to the SAC 210 when the initial processing of all of the provisioning messages for this message block is completed. In addition a batched set of table changes may be dependent or based upon one another meaning that when a failed request depends upon another subrequest, then all related subrequests are rolled back or undone before sending an error message.

CONCLUSION

The present invention thus allows an interface between a service activation controller and a services management system to provide a more efficient system for creating, updating and reading call processing records and tables. The preferred embodiment provides a service provisioning interface to allow the direct communication between a service activation controller receiving a service order and the service management system for insuring the activation of the service order.

The foregoing description of preferred embodiments of the invention description is not intended to be exhaustive or to limit the invention to the precise form disclosed. Modifications and variations are possible in light of the above teachings or may be acquired from practice of the invention. The implementations explain the principles of the invention and its practical application to enable one skilled in the art to use the invention in various embodiments and with various modifications as are suited to the particular use contemplated. The scope of the invention be defined by the claims appended hereto, and their equivalents.

We claim:

1. A method for automatically processing a provisioning message for adding or modifying service requests provided by a telecommunications network, the provisioning message having customized call variable data related to the service request, and an identification code for a template corresponding to the service request, the method comprising the steps of:

a) decoding the provisioning message to extract the identification code and customized call variable data;

b) retrieving from a central memory the template corresponding to the extracted identification code; and c) automatically generating a service record for execution by the telecommunications network by inserting the extracted customized call variable data for corresponding call variables into the retrieved template in accordance with the provisioning message.

2. A method in accordance with claim 1, wherein the step of decoding further includes the substeps of:

comparing a format of the provisioning message to a predetermined request format; and outputting an error message to a service activation controller when the format of the provisioning message does not match the predetermined format.

3. A method in accordance with claim 1 wherein the provisioning message includes a plurality of service activation subrequests and steps b) and c) are sequentially performed on each service activation subrequest.

4. A method in accordance with claim 3, further including the step of:

outputting an error message when any one of the plurality of subrequests does not match a predetermined format.

5. A method in accordance with claim 1 wherein the requested service is for creation of a call processing record (CPR) and the method further includes the steps of:
  determining whether the CPR exists;
  outputting an error message when the CPR exists; and
  creating the CPR when the CPR does not exist.

6. A method in accordance with claim 1, wherein the requested service is for changing a call processing record (CPR) and the method further includes the steps of:
  determining whether the CPR exists;
  outputting an error message when the CPR does not exist; and
  changing the CPR when the CPR exists.

7. A method in accordance with claim 1, wherein the requested service is for deleting a call processing record (CPR) and the method further includes the steps of:
  determining whether the CPR exists;
  outputting an error message when the CPR does not exist; and
  deleting the CPR when the CPR exists.

8. A method in accordance with claim 1, wherein the requested service is for suspending a call processing record (CPR) and the method further includes the steps of:
  determining whether the CPR exists;
  generating an error when the CPR does not exist; and
  marking the CPR as non-accessible.

9. A method in accordance with claim 1, wherein the requested service is for creation of a table with a designated table format, the table holding data to be accessed by a call processing record (CPR) and the method further includes the steps of:
  determining whether the table exists;
  outputting an error message when the table exists; and
  creating the table when the table does not exist.

10. A method in accordance with claim 1, wherein the requested service is for modifying a table, the method further including the steps of:
  determining whether the table exists;
  modifying a table when the table exists; and
  outputting an error message when the table does not exist.

11. A method in accordance with claim 10, wherein the step of modifying a table includes the step of:
  adding a row to the table using the call data in the provisioning message.

12. A method in accordance with claim 10, wherein the step of modifying a table includes the step of:
  deleting a row in the table when the table exists.

13. A method in accordance with claim 10, wherein the provisioning message includes a batching flag and a future activation time and the method further includes the steps of:
  collecting a plurality of modify requests when the batching flag is set; and
  activating the collected plurality of modify requests when the activation time arrives.

14. A method in accordance with claim 1, wherein the requested service is for deletion of a table and the method further includes the steps of:
  determining whether the table exists;
  outputting an error message when the table does not exist; and
  deleting the table when the table exists.

15. A method in accordance with claim 1, further including the steps of:
  creating a status log;
  entering a status of the provisioning message as pending after the step of generating a service record; and
  generating an acknowledgment signal for output to a service activation controller.

16. A method in accordance with claim 15, further including the steps of:
  outputting the service data to an integrated services control point;
  receiving an activation acknowledgment signal from the integrated services control point; and
  outputting an activation complete signal to the service activation controller.

17. A method for processing a provisioning message in accordance with claim 1, further including the step of:
  queuing the provisioning message in one of a plurality of queues in response to a priority level specified in the provisioning message.

18. A method in accordance with claim 17, further including the steps of:
  reading a provisioning message from a first queue for a first predetermined amount of time; and
  reading a provisioning message from a second queue for a second predetermined amount of time.

19. A system for automatically processing a provisioning message for adding or modifying service requests provided by a telecommunications network, the provisioning message having customized call variable data related to the service request, and an identification code for a template corresponding to the service request, the system comprising:
  means for decoding the provisioning message to extract the identification code and customized call variable data;
  means for retrieving from a central memory the template corresponding to the extracted identification code; and
  means for automatically generating a service record for execution by the telecommunications network by inserting the extracted customized call variable data for corresponding call variables into the retrieved template in accordance with the provisioning message.

20. A system in accordance with claim 19, wherein the decoding means further includes:
  means for comparing a format of the provisioning message with a predetermined format; and
  means for outputting an error message to a service activation controller when the format of the provisioning message does not match the predetermined format.

21. A system in accordance with claim 19 wherein the provisioning message includes a plurality of provisioning messages and the means for retrieving and generating sequentially process each provisioning message.

22. A system in accordance with claim 21, further includes:
  means for outputting an error message when any one of the plurality of provisioning messages does not match the predetermined format.

23. A system in accordance with claim 19, wherein the requested service is for creation of a call processing record (CPR) and the system further includes:
  means for determining whether the CPR exists; and
  means for outputting an error message when the CPR exists.

24. A system in accordance with claim 19, wherein the requested service is for changing a call processing record (CPR) and the system further includes:

means for determining whether the CPR exists; and means for outputting an error message when the CPR does not exist.

25. A system in accordance with claim 19, wherein the requested service is for deleting a call processing record (CPR) and the system further includes:

means for determining whether the CPR exists; and means for outputting an error message when the CPR does not exist.

26. A system according to claim 19, wherein the requested service is for suspending a call processing record (CPR) and the system further includes:

means for determining whether the CPR exists;

means for generating an error when the CPR does not exist; and means for marking the CPR as non-accessible.

27. A system according to claim 19, wherein the requested service is for creation of a table with a designated table format, the table holding data to be accessed by a call processing record (CPR) and the system further includes:

means for determining whether the table exists;

means for outputting an error message when the table exists; and means for creating the table when the table does not exist.

28. A system for recessing a provisioning message according to claim 19, wherein the request is for the modification of a table and the system further includes:

means for determining whether the table exists;

means for modifying the table when the table exists; and means for outputting an error message when the table does not exist.

29. A system according to claim 28, wherein the means for modifying a table includes:

means for adding a row to the table using the call data in the provisioning message when the table exists; and means for outputting an error message when the row already exists.

30. A system according to claim 28, wherein the means for modifying a table includes:

means for deleting a row in the table when the table exists; and means for outputting an error message when the row does not exist.

31. A system in accordance with claim 28, wherein the provisioning message includes a batching flag and a future activation time and the system further including:

means for collecting a plurality of modify requests when the batching flag is set; and means for activating the collected plurality of modify requests when the activation time arrives.

32. A system according to claim 19, wherein the requested service is for deletion of a table and the system further includes:

means for determining whether the table exists;

means for outputting an error message when the table does not exist; and means for deleting the table when the table exists.

33. A system in accordance with claim 19, further including:

means for creating a status log;

means for entering a status of the provisioning message as pending after the service request record is generated; and means for generating an acknowledgment signal for output to a service activation controller.

34. A system according to claim 33, further including:

means for outputting the service data to an integrated services control point;

means for receiving an activation acknowledgment signal from the integrated services control point; and means for outputting an activation complete signal to the service activation controller.

35. A system in accordance with claim 19, further including:

means for queuing the provisioning message in one of two queues in response to a priority level specified in the provisioning message.

36. A system in accordance with claim 35, further including:

means for processing a first number of decoded provisioning messages queued in a first queue; and means for processing a second number of decoded provisioning messages queued in a second queue.

37. A system in accordance with claim 36, further including:

means for processing provisioning messages in a first queue during a first time period; and means for processing provisioning messages in a second queue during a second time period.

38. A system in accordance with claim 19, wherein the means for decoding includes:

means for changing the provisioning message from a first format to a second format, the second format including a plurality of message blocks, each containing one or more service activation subrequests.

* * * * *